July 22, 1924.
A. C. HARGRAVE
DEMOUNTABLE RIM
Filed May 9, 1922
1,502,630
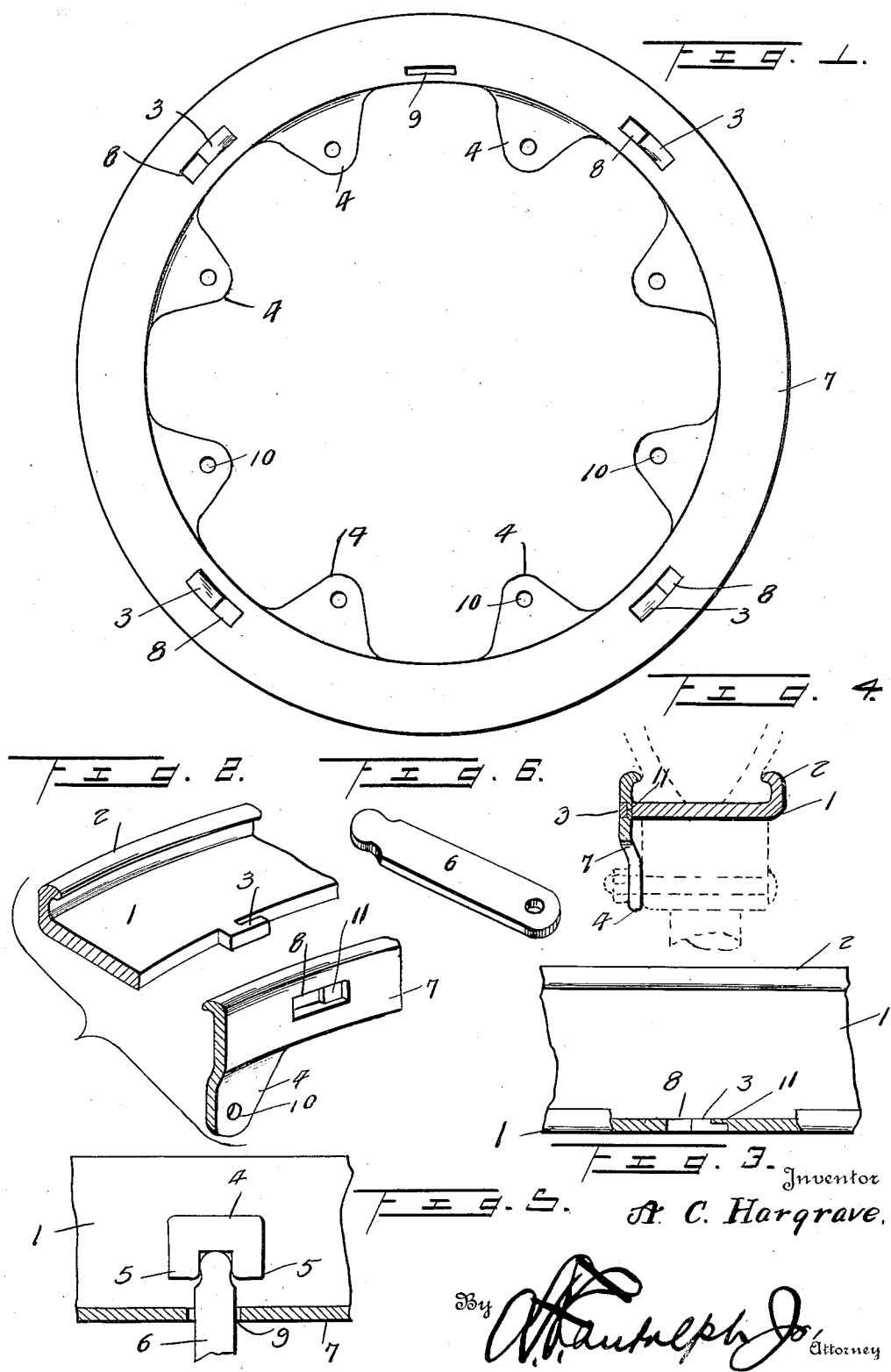

Patented July 22, 1924.

1,502,630

UNITED STATES PATENT OFFICE.

ALLEN C. HARGRAVE, OF ANNA, ILLINOIS, ASSIGNOR OF ONE-TENTH TO ED. SAMSON, OF ANNA, ILLINOIS.

DEMOUNTABLE RIM.

Application filed May 9, 1922. Serial No. 559,532.

*To all whom it may concern:*

Be it known that I, ALLEN C. HARGRAVE, a citizen of the United States, residing at Anna, in the county of Union and State of Illinois, have invented certain new and useful Improvements in Demountable Rims; and I do hereby declare the following to be a full, clear, and exact description of the invention, such as will enable others skilled in the art to which it appertains to make and use the same.

This invention relates to vehicle wheels adapted to receive pneumatic tires and more particularly to the rim which is detachable so as to facilitate replacement of a deflated tire.

In accordance with the present invention, the demountable rim has an outer tire retaining flange at one side and a plurality of hooks extending outwardly from the opposite side and a detachable ring having slots to receive said hooks whereby to secure the ring to the rim, the outer edge portion of the ring constituting a tire retaining flange, the ring being engaged or disengaged from the hooks by a rotary movement which is rendered easy by the use of a lever which passes through an opening in the ring and engages a lug of the rim.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a demountable rim embodying the invention,

Figure 2 is a detail perspective view of a portion of the rim, the parts being separated and shown on a larger scale, Figure 3 is a detail view of a portion of the rim showing more clearly the hook and slot connection between the parts, Figure 4 is a transverse section, Figure 5 is a detail view showing the means for rotating the ring, and Figure 6 is a detail view of the ring rotating lever.

Corresponding and like parts are referred to in the following description and designated in the several views of the drawings by like reference characters.

The rim is designated by the numeral 1 and is provided at one side with an outwardly extending tire retaining flange 2 which may be of any shape according to the style of tire for which the rim is designed. A plurality of hooks 3 project outwardly from the opposite side of the rim 1 and preferably form a part thereof. A projection 4 is formed upon the inner side of the rim 1 and is notched to provide lugs 5 to receive the inner end of a lever 6.

A ring 7 is detachably fitted to the side of the rim 1 having the hooks 3 and has slots or elongated openings 8 in number and position to register with the hooks 3, whereby the ring is held in place when properly fitted to the rim. The outer edge portion of the ring 7 projects beyond the rim 1 and constitutes a tire retaining flange to cooperate with the flange 2, whereby to hold the tire in place when mounted upon the rim. A slot or opening 9 is formed in the ring 7 opposite the projection 4 to receive the end of the lever 6 whereby force may be exerted to rotate the ring to engage it with or disengage it from the hooks 3. Apertured ears 10 extend inwardly from the ring 5 to receive the threaded ends of the bolts of the vehicle wheel in a manner well understood, whereby to hold the rim in place after being positioned upon the wheel. The projection 4 also prevents movement of the rim by entering an opening, not shown, formed in the felly or felly band of the wheel as will be readily understood.

When the rim is detached from a vehicle wheel, the tire, solid or pneumatic, may be readily mounted thereon or removed therefrom after the ring 7 has been displaced. When the ring 7 is in position, the hooks 3 extend through the slots or elongated openings 8, the bills of the hooks engaging the ring at one end of the slots or openings 8, as indicated most clearly in Figure 3. The ring 7 is engaged with or disengaged from the hooks 3 by a rotary movement which brings the hooks in position to register with the slots 8 when the ring may be easily detached or placed in position. Rotation of the ring 5 is readily effected by means of the lever 6 which is passed through the slot or opening 9 and between the lugs 5. Movement of the lever in one direction rotates the ring 7 in one direction, and movement of the lever in an opposite direction reverses the movement of the ring, whereby the hooks may be engaged or disengaged as required. A portion of the ring 7 at one end of each of the slots 8 is cut away, as indicated at 11, to receive the bill of the cooperating hook, whereby to prevent the hooks 3 from projecting beyond the outer side of the ring 7 and to come flush therewith.

What is claimed is:

1. A demountable rim structure including a rim, a tire-retaining ring at one side thereof, interengaging means on said rim and ring to engage and disengage through the rotation of one of said parts relatively to the other part, means on the inner surface of the rim engageable by a tool to effect the said movement and the ring having an opening through which the tool may extend and fulcrum to impart said movement.

2. A demountable rim structure including a rim, a tire-engaging ring at one side thereof, interengaging means on said rim and ring to engage and disengage through rotation of one of said parts relatively to the other part, a projection extending inwardly from the inner surface of the ring for engagement by a tool to effect the said movement, said projection being adapted to enter the wheel felly to anchor it thereon, and fastening means extending inwardly from the ring for connection to a wheel.

3. A demountable rim structure including a rim, said rim having a plurality of hooks extending outwardly from one side thereof, a tire-retaining ring at said side having slots to coact with said hooks, each slot adjacent one end extending but partly through the ring whereby means is afforded for engagement by the bills of the hooks, a projection integral with the rim and extending inwardly from its inner surface and adapted to enter the felly of the wheel, said ring having an opening therethrough to enable a lever to engage said projection and in which said lever fulcrums, and ears integral with said ring and adapted for attachment to a wheel.

In testimony whereof I affix my signature in presence of two witnesses.

ALLEN C. HARGRAVE.

Witnesses:
THOMAS H. FERGUSON,
JOHN M. BOLON.